(12) United States Patent
Grylls et al.

(10) Patent No.: US 6,998,151 B2
(45) Date of Patent: Feb. 14, 2006

(54) METHOD FOR APPLYING A NIAL BASED COATING BY AN ELECTROPLATING TECHNIQUE

(75) Inventors: Richard Grylls, Albuquerque, NM (US); Theodore Robert Grossman, Hamilton, OH (US)

(73) Assignee: General Electric Company, Cincinnati, OH (US)

(*) Notice: Subject to any disclaimer, the term of this patent is extended or adjusted under 35 U.S.C. 154(b) by 254 days.

(21) Appl. No.: 10/143,662

(22) Filed: May 10, 2002

(65) Prior Publication Data

US 2003/0211239 A1 Nov. 13, 2003

(51) Int. Cl.
*B05D 3/02* (2006.01)
*B05D 1/36* (2006.01)
*C23C 4/08* (2006.01)
*C23C 28/00* (2006.01)
*C25D 15/00* (2006.01)

(52) U.S. Cl. .................. 427/191; 427/192; 427/383.1; 427/404; 427/405; 427/437; 427/438; 427/456; 205/109; 205/118; 205/170; 205/176; 205/178; 205/180; 205/181; 205/191

(58) Field of Classification Search ............. 427/191, 427/192, 404, 405, 437, 438, 456, 383.1; 205/109, 118, 170, 176, 178, 180, 181, 191, 205/192
See application file for complete search history.

(56) References Cited

U.S. PATENT DOCUMENTS

| 4,789,441 A | 12/1988 | Foster et al. |
| 4,810,334 A | 3/1989 | Honey et al. |
| 5,833,829 A | 11/1998 | Foster |
| 5,879,532 A | 3/1999 | Foster et al. |
| 6,129,991 A * | 10/2000 | Warnes et al. ............. 428/610 |
| 6,153,313 A | 11/2000 | Rigney et al. |
| 6,695,960 B1 * | 2/2004 | Bacos et al. ............. 205/74 |
| 2002/0098294 A1 * | 7/2002 | Lau et al. ............. 427/454 |

* cited by examiner

*Primary Examiner*—Edna Wong
(74) *Attorney, Agent, or Firm*—McNees Wallace & Nerick LLC; Carmen Santa Maria, Esq.; Kurt Ehresman, Esq.

(57) ABSTRACT

The present invention provides a method to coat an article using a plating process, either electroless or electrolytic, whereby nickel is plated on the article using a solution that includes a suspension of powders or containing one or more of the following elements: Ni, Cr, Al, Zr, Hf, Ti, Ta, Si, Ca, Fe, Y and Ga. Optionally, the coating is then heat treated at a temperature above about 1600° F. for an effective amount of time to allow to homogenize the coating by allowing effective interdiffusion between the species. The level of aluminum may be altered to produce a coating of the predominantly β phase of the NiAl alloy composition. Optionally, a TBC layer is applied over the predominantly β phase NiAl alloy composition metallic bond coat.

15 Claims, 1 Drawing Sheet

METHOD FOR APPLYING A NIAL BASED COATING BY AN ELECTROPLATING TECHNIQUE

FIELD OF THE INVENTION

This invention relates generally to components of the hot section of gas turbine engines, and in particular, to a method for achieving a predominantly β phase NiAl alloy composite coating by an electroplating technique.

BACKGROUND OF THE INVENTION

In gas turbine engines, for example, aircraft engines, air is drawn into the front of the engine, compressed by a shaft-mounted rotary compressor, and mixed with fuel. The mixture is burned, and the hot exhaust gases are passed through a turbine mounted on a shaft. The flow of gas turns the turbine, which turns the shaft and drives the compressor. The hot exhaust gases flow from the back of the engine, providing thrust that propels the aircraft forward.

During operation of gas turbine engines, the temperatures of combustion gases may exceed 3,000 degrees F., considerably higher than the melting temperatures of the metal parts of the engine, which are in contact with these gases. The metal parts that are particularly subject to temperature extremes and degradation by the oxidizing and corrosive environment, and thus require particular attention with respect to cooling, are the hot section components exposed to the combustion gases, such as blades and vanes used to direct the flow of the hot gases, as well as other components such as shrouds and combustors.

The hotter the exhaust gases, the more efficient is the operation of the jet engine. There is thus an incentive to raise the exhaust gas temperature. However, the maximum temperature of the exhaust gases is normally limited by the materials used to fabricate the hot section components of the turbine. In current engines, hot section components such as the turbine vanes and blades are made of cobalt-based and nickel-based superalloys, and can operate in temperature ranges of 2000°–2300° F. and higher.

The metal temperatures can be maintained below melting levels with current cooling techniques by using environmental coatings alone or in combination with thermal barrier coatings (TBCs). TBCs includes a ceramic thermal barrier coating that is applied to the external surface of metal parts within engines to impede the transfer of heat from hot combustion gases to the metal parts, thus insulating the component from the hot gases. This permits the exhaust gas to be hotter than would otherwise be possible with the particular material and fabrication process of the component.

TBCs are well-known ceramic coatings, for example, yttrium stabilized zirconia. Ceramic TBCs usually do not adhere optimally directly to the superalloys used in the substrates. Therefore, an environmental metallic coating called a bond coat is placed between the substrate and the TBC to improve adhesion of the TBC to the underlying component. The bond coat temperature is critical to the life of the TBC and has been limited to about 2100° F. Once the bond coat exceeds this temperature, the coating system can quickly deteriorate, resulting in spallation of the TBC from the bond coat.

These bond coats are typically applied by several suitable techniques. The coating may be produced by manufacturing a powder of the appropriate composition, then using a thermal spray technique, such as, for example, low pressure plasma spray (LPPS), high velocity oxy-fuel (HVOF) and D-Gun to apply the powder to the airfoil to form a thin coating. These processes tend to be line of sight processes and are effective for smooth regular surfaces, but are not as effective for complex shapes such as air foils.

Coatings also may be applied by diffusion processes such as vapor phase aluminiding (VPA), co-deposition techniques (CODEP), and similar processes. In these processes, the part to be coated is heated to an elevated temperature in a retort having an atmosphere rich in a certain element or elements, often aluminum, in which a partial pressure of an aluminum or other desired vapor is developed in the retort. These elements diffuse into the surface of the part to form a diffusion coating.

A coating can be applied by chemical vapor deposition (CVD) in which a vapor of the desired elements required to produce the coating are formed in a chamber external to the part to be coated. This vapor is then introduced into a second chamber containing the part, wherein the vapor is deposited on the part.

A coating also may be applied by an electroplating technique whereby the part to be coated is immersed in a bath containing metallic ions, such as Pt, Rh, Pd, Ni, which are then transferred to the surface of the part by the passage of an electric current. Combinations of electroplating and the previously discussed processes may be used. For example, Pt, Ni, or any combination thereof may first be applied to a substrate by electrodeposition. Aluminum may then be applied by a technique such as VPA to produce a modified PtAl coating.

Another bond coat utilizes a MCrAlY(X) where M is an element selected from Fe, Co and Ni and combinations thereof and (X) is an optional element selected from gamma prime formers, solid solution strengtheners, grain boundary strengtheners and combinations thereof. The MCrAlY(X) is applied by, for example, physical vapor deposition (PVD) processes such as electron beam (EB), ion-plasma thermal spray, or sputtering.

Whereas a MCrAlY(X) provides good resistance to high temperature hot corrosion, it does not provide good resistance to high temperature oxidation. In comparison, diffusion coatings applied by CVD and PVD have increased resistance to high temperature oxidation. In particular, diffusing Al into the substrate has proven effective against high temperature oxidation. The CVD bond coat forms an aluminum oxide scale during exposure to oxygen containing atmospheres at elevated temperatures. A coating of intermetallic β phase NiAl has been found to be most effective at increasing both hot corrosion resistance and high temperature oxidation. However, a β phase NiAl is, by nature, a brittle substance with little ductility. A TBC applied over the bond coat allows the article to achieve even higher operating temperatures. Technologies that allow longer life for such coatings, or allow higher operating temperatures, are of significant benefit. In U.S. Pat. No. 6,153,313, assigned to the assignee of the present invention and incorporated by reference herein, Rigney et al. teaches that a β phase NiAl coating (about 30 to 60 atomic percent aluminum) containing alloying additions of rare earth and other elements that increase the creep strength of a bond coat result in both improved spallation and oxidation resistance. However, Rigney does not teach the methodology by which this bond coat might be successfully applied to a complexly-shaped article of commercial interest, such as a turbine airfoil.

Considerable difficulty is encountered in processing an intermetallic coating such as NiAl by conventional means, such as thermal spray. Of course, diffusion methods produce a gradient of compositions and the not the desired discrete B-phase intermetallic. Known powder electroplating techniques allow such a coating to be applied with little to no deformation of the coating.

Coating an article by depositing a coating layer or series of coating layers by electroplating and then depositing a second coating layer or series of coating layers on the electroplated coating layer by physical vapor deposition is known in the art. For example, U.S. Pat. No. 5,879,532 teaches electroplating a brass article, pulse blow drying the article after electroplating, and then adding additional coats using a vapor deposition process.

Additionally, U.S. Pat. Nos. 4,789,441; U.S. Pat. No. 4,810,334; and U.S. Pat. No. 5,833,829 all teach methods of entrapment plating whereby a metal or metals are electroplated on the surface of an article. Simultaneously, a powder or powders are present in the plating bath, and during plating these powder particles become entrapped in the plate. A coating having some fraction of powder particles entrapped in the metallic matrix is obtained. U.S. Pat. No. 4,789,441 patent teaches subsequent heat treatment of the coating to obtain interdiffusion between the constituents of the matrix and the particles.

However, a level of Al in the powder sufficient to give the amount required to achieve the predominantly β phase NiAl coating of Rigney with its increased resistance to high temperature oxidation would be unstable in a standard plating solution. While U.S. Pat. No. 5,833,829 patent teaches an optional subsequent aluminizing process using a pack or vapor phase aluminizing process, it does not recognize or try to achieve the advantageous qualities of the β phase of NiAl as taught by Rigney.

What is needed are improved methods to apply a bond coat to obtain the β phase of NiAl taught by Rigney. The present invention fulfills this need, and further provides related advantages by conceiving a method to produce a bond coat to achieve the benefits taught by Rigney using an electroplating technique.

SUMMARY OF THE INVENTION

In one form, the present invention provides a method to coat an article using an electroplating process, whereby nickel is plated on the article using a solution including a suspension of at least one powder including one or more of the following elements: Cr, Al, Zr, Hf, Ti, Ta, Si, Ca, Fe, Y and Ga. The powder may be an alloy comprised of these elements in preselected amounts, or a plurality of powders comprised substantially of the additional alloying elements in preselected amounts, or combinations of these. The purpose of the powder additions is to achieve a composition that is a substantially β phase NiAl having beneficial amounts of additional alloying elements. If entrapped aluminum powders provide an insufficient aluminum content to develop a substantially β phase NiAl, the aluminum content can be increased by deposition of a sufficient amount of aluminum in a subsequent, post-aluminiding step to develop the required composition in order to achieve a substantially β phase of the NiAl alloy composition in any required concentration, including the preselected amounts of alloying elements. As required to achieve a homogeneous β phase NiAl, the coating is then heat treated at a temperature above about 1600° F. for a sufficient period of time to homogenize the various elements in the Ni matrix by effective interdiffusion in the matrix. One of the results of this interdiffusion will be to change the character of the matrix to an intermetallic matrix of NiAl.

In yet another embodiment, the present invention comprises adding a TBC layer over the substantially β phase NiAl alloy composition metallic bond coat.

The present invention also includes the substantially β phase NiAl alloy composition metallic bond coat and a thermal barrier system having a substantially β phase NiAl alloy composition metallic bond coat TBC system formed using this process.

One advantage of the present invention is the ability to specifically achieve the substantially β phase of NiAl alloy composition, with its related advantages, utilizing an electroplating technique. While existing art has taught the use of an NiAl electroplating bath, heretofore, the advantages of the β phase of NiAl alloy composition produced by electrodeposition have not been appreciated and no attempt has been made to produce a substantially β phase layer by electrodeposition techniques.

Another advantage of the present invention is that the metallic coating produced by this invention is a non-line of sight process, and therefore, can be utilized to coat complex shapes and articles having recessed surfaces and exposed surfaces of apertures.

Still another advantage is that much of the processing occurs at or near ambient temperature. This allows for cost savings during the manufacturing process over, for example, thermal spray techniques.

Still another advantage of the present invention is that post-aluminiding increases the Al-content of external surfaces and allows internal cooling passages to be coated, to provide the preferred β phase NiAl alloy composition of optimal composition.

Yet another advantage of the present invention is that the process can be easily adapted for use in airfoil material repair operations. It is advantageous to have the ability to repair a damaged section of an airfoil, rather than having to strip the entire TBC coating and completely re-bond and re-coat a TBC coating to the entire part.

Another advantage of the present invention is that the process can be easily retrofitted to existing VPA and CVD production processes. Continuing and often interrelated improvements in processes and materials, such as the improvements of the present invention, can provide cost reductions and major increases in the performance of devices such as aircraft gas turbine engines.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE PREFERRED EMBODIMENT

Figure 1:
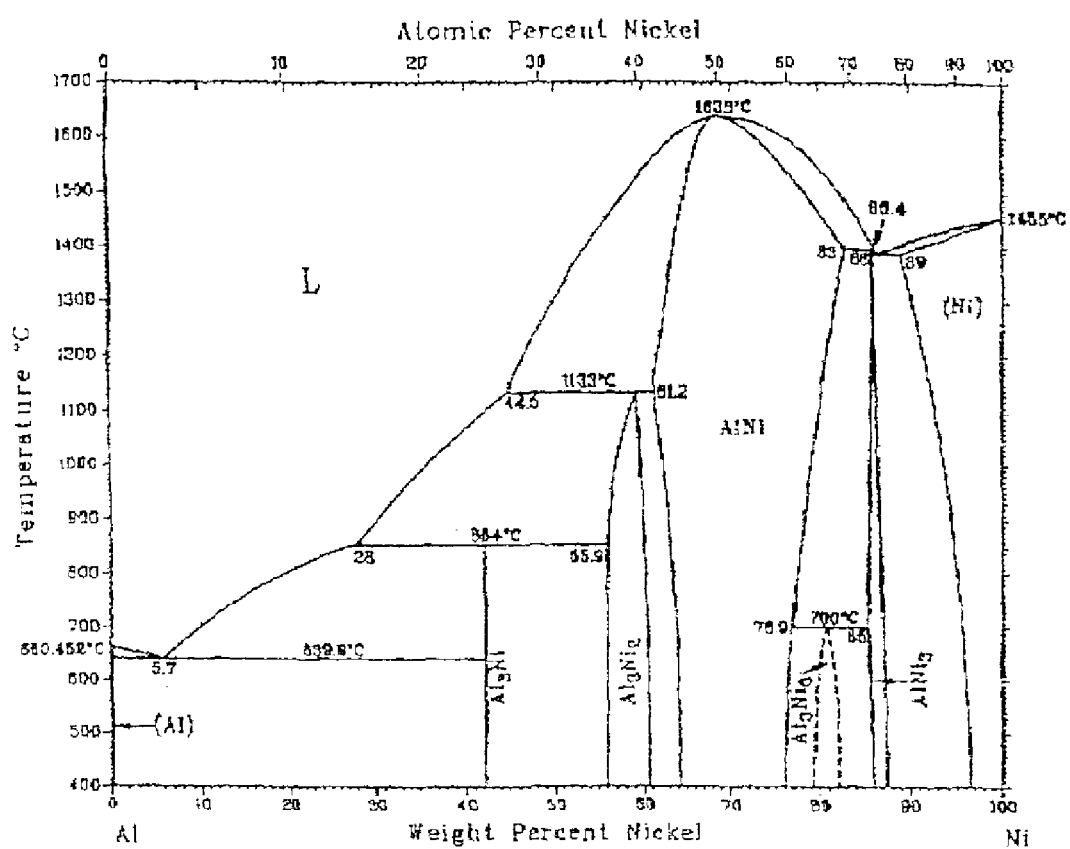
FIG. 1 is a phase diagram of NiAl.

The present invention is generally applicable to components that operate within environments characterized by relatively high temperatures, and are therefore subject to severe thermal stresses and thermal cycling. Examples of such components include the high and low-pressure turbine nozzle blades and vanes, shrouds, combustor liners and augmentor hardware of gas turbine engines. The invention is particularly useful for articles of complex shape such as turbine blades and vanes.

Substrate materials often used in these aircraft engine articles and power generation equipment articles may include nickel, cobalt, or iron based superalloys. The alloys may be cast or wrought superalloys having high temperature capability. Examples of such substrate materials include GTD-111, GTD-222, René80, René41, René125, René77, RenéN4, RenéN5, RenéN6, $4^{th}$ generation single crystal superalloy MX-4, Hastelloy X, and cobalt-based HS-188.

According to a preferred embodiment, a composite coating is electrodeposited on a substrate by known methods, such as those described in, for example, U.S. Pat. No. 4,789,441; U.S. Pat. No. 4,810,334; and U.S. Pat. No. 5,833,829, all of which are incorporated by reference herein. The electrodeposition may be electrolytic or electroless. The composite coating comprises a metal matrix of, for example, Ni, Co, Fe or combinations thereof, but preferably Ni, containing fine particles of one or more of the following elements: Ni, Cr, Al, Zr, Hf, Ti, Ta, Si, Ca, Fe, Y and Ga.

This electrodeposition produces a coating in which particles forming one phase are disbursed or entrapped in a matrix forming a second phase. Unlike coatings produced by spraying techniques, the relative amounts of the individual components may be easily varied. Although not required, the coating may be subjected to a heat treatment to produce diffusion between the matrix and the particles to further improve coating properties and or surface finish.

The optional heat treatment is at a temperature above about 1600° F. for a period of time, preferably between about ½ and 2½ hours, sufficient to allow diffusion between the elements comprising the entrapped powders and the matrix. The heat treatment may desirably also result in a refinement of the microstructure. In one example, it is envisioned the substrate and coating are subjected to a hot isostatic pressure (HIP) cycle of two hours at about 2048° F. (1120° C.) in argon at 140 MPa. HIP provides an additional advantage in that it will cure any interface voiding or other type of debonding between the substrate and the coating.

As displayed in FIG. 1, the β phase of NiAl occurs at about 61 to about 83 wt. % Ni (about 17 to about 39 wt. % Al). The electrodeposition bath does not support this high a percentage of Al, because the Al will be saturated at much lower percentage levels and then precipitate from the solution. In this embodiment, the ratio of Ni to Al contains insufficient Al to produce a β phase NiAl coating. In order to achieve the required ratio of Ni and Al for a β-NiAl coating, following removal from the electrodeposition bath, the coated substrate is subjected to an additional aluminiding process, for example, vapor-phase-aluminizing (VPA), chemical-vapor-deposition of aluminum (CVD) or any other convenient diffusion aluminide process for a predetermined time, temperature and pressure that will achieve the required NiAl ratio necessary to produce a coating that is substantially β phase containing the alloying additions as described by Rigney.

When the β-NiAl coating is to be achieved by entrapment plating, the particle size has an equivalent spherical diameter of less than about 25 microns and preferably less than about 15 microns. Ideally, the particles should be uniformly suspended throughout the electrodeposition bath. This can be accomplished by agitating the bath by mechanical mixing or even ultrasonic agitation. The method of agitation does not matter, so long as the particles are well distributed throughout the bath during the electroplating operation. In one embodiment, the final metallic bond coating of substantially β phase NiAl comprising the alloying additions as described by Rigney is about 30 to 60 atomic % Al (equivalent to about 17 to about 39 wt. % Al),at least one element selected from the group consisting of Cr in the amount of 0.5–25 atomic percent; Ti in the amount of about 0.1 to about 5 atomic percent; and Hf in the amount of about 0.01 to about 2 atomic percent; and optionally one additional element selected from the group consisting of Ta in the amount of about 0.1 to about 5 atomic percent; Si in the amount of about 0.1 to about 5 atomic percent; Ga in the amount of about 0.02 to about 0.2 atomic percent; Zr in the amount of about 0.01 to about 0.5 atomic percent; Ca in the amount of about 0.01 to about 1 atomic percent; Fe in the amount of about 0.02 to about 0.5 atomic percent; Y in the amount of about 0.01 to about 1 atomic percent; and the balance nickel and impurities. The prealloyed powder is melted within the composition limits and then formed into powder using well-known techniques and then screened to the appropriate size. The composition range of the powder can be varied within these limits to achieve whatever coating composition is desired within the parameters set forth by Rigney for the β0 phase NiAl coating. Additionally, the coating composition can be varied within limits by adjusting the ratio of plating solution to powder. In one embodiment, the prealloyed powder, after being screened to the appropriate size, is provided with a thin coating of Ni. This Ni can be applied for example by sputtering. This pretreatment of the prealloyed powder with Ni assists in entrapping the powder when the plating is electrolyticly applied to the substrate, as the Ni—Ni bond is more readily formed during the plating process.

In a second embodiment, the metallic bond coating of substantially β phase NiAl includes alloying additions of about 30 to 50 atomic percent Al, about 0.5 to about 15 atomic percent Cr; and at least one element selected from the group consisting of about 0.1 to about 5 atomic percent Ti; about 0.01 to about 2 atomic percent Hf; about 0.1 to about 2 atomic percent Si; about 0.02 to about 0.2 atomic percent Ga; about 0.01 to about 0.5 atomic percent Zr; about 0.02 to about 0.5 atomic percent Fe; about 0.01 to about 0.01 to about 1 atomic percent Y; and the balance nickel and impurities.

Optionally, after the substantially β phase NiAl composite coating is applied, a TBC is deposited using known methods to further increase thermal insulation of the substrate.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A method for coating an article used in a gas turbine engine comprising the steps of:
    plating a substrate with a composite coating, the coating comprising a substantially nickel matrix and powders selected from the group of elements consisting of Ni, Cr, Al, Zr, Hf, Ti, Ta, Si, Ca, Fe, Y, Ga, and combinations thereof, such that upon deposition, the powders form a second phase dispersed in the substantially nickel matrix forming a first phase; and,
    depositing on the coated substrate a sufficient amount of aluminum by an aluminiding process to provide a NiAl stoichiometry achieve a substantially β phase NiAl alloy coating composition.

2. The method of claim 1 comprising the additional step of homogenizing the composite coating applied to the substrate by heat treating the coated substrate at an effective temperature for a sufficient period of time to interdiffuse the elements in the powders through the matrix.

3. The method of claim 2 wherein the effective temperature is above about 1600° F. and the sufficient period of time is about 0.5 to about 2.5 hours.

4. The method of claim 1 wherein the coating composition further comprises about 30 to 60 atomic percent Al, at least one element selected from the group consisting of Cr in the amount of about 0.5 to about 25 atomic percent, Ti in the amount of about 0.1 to about 5 atomic percent, and Hf in the amount of about 0.01 to about 2 atomic percent; and optionally at least one element selected to the group consisting of Ta in the amount of about 0.1 to about 5 atomic percent, Si in the amount of about 0.1 to about 5 atomic percent, Ga in the amount of about 0.02 to a out 0.2 atomic percent, Zr in the amount of about 0.01 to about 0.5 atomic percent, Ca in the amount of about 0.01 to about 1 atomic percent, Fe in the amount of about 0.02 to about 0.5 atomic percent, Y in the amount of about 0.01 to about 1 atomic percent; and the balance nickel and incidental impurities.

5. The method of claim 1 wherein the coating composition further comprises about 30 to about 50 atomic percent Al, about 0.5 to about 15 atomic percent Cr, and at least one element selected from the group consisting of Ti in the amount of about 0.1 to about 5 atomic percent, Hf in the amount of about 0.01 to about 2 atomic percent, Si in the amount of about 0.1 to about 2 atomic percent, Ga in the amount of about 0.02 to about 0.2 atomic percent, Zr in the amount of about 0.01 to about 0.5 atomic percent, Fe in the amount of about 0.02 to about 0.5 atomic percent, Y in the amount of about 0.01 to about 1 atomic percent and the balance nickel and incidental impurities.

6. The method of claim 1 wherein the plating step is electrolytic.

7. The method of claim 1 wherein the plating step is electroless.

8. The method of claim 1 wherein the particle size of the powders is less than about 25 microns.

9. The method of claim 8 wherein the particle size of the powders is less than about 15 microns.

10. The method of claim 1 wherein the powers are uniformly suspended throughout an electrodeposition bath.

11. The method of claim 1 wherein the aluminiding process is a vapor phase aluminizing process and the aluminum deposited is in sufficient amount to produce a stoichiometric composition for a substantially β phase NiAl alloy coating.

12. The method of claim 1 wherein the aluminding process is chemical vapor deposition and the aluminum deposited is in sufficient amount to produce a stoichiometric composition for a substantially β phase NiAl alloy coating.

13. The method of claim 1 further comprising the step of depositing a thermal barrier coating over the substantially β phase NiAl alloy coating composition.

14. A method for coating an article used in a gas turbine engine comprising the steps of:

plating a substrate with a composite coating, the composite coating comprising a substantially nickel matrix and powders selected from the group consisting of Ni, Cr, Al, Zr, Hf, Ti, Ta, Si, Ca, Fe, Y, Ga, and combinations thereof, such that upon deposition, the powders form a second phase dispersed in the nickel matrix forming a first phase; and, depositing on the coated substrate a sufficient amount of aluminum by an aluminizing process to provide a NiAl stoichiometry to achieve a substantially β phase NiAl alloy coating composition, wherein the coating composition comprises about 30 to 60 atomic percent Al, at least one element selected from the group consisting of Cr in the amount of about 0.5 to about 25 atomic percent, Ti in the amount of about 0.1 to about 5 atomic percent, and Hf in the amount of about 0.01 to about 2 atomic percent; and optionally at least one element selected from the group consisting of Ta in the amount of about 0.1 to about 5 atomic percent, Si in the amount of about 0.1 to about 5 atomic percent, Ga in the amount of about 0.02 to about 0.2 atomic percent, Zr in the amount of about 0.01 to about 0.5 atomic percent, Ca in the amount of about 0.01 to about 1 atomic percent, Fe in the amount of about 0.02 to about 0.5 atomic percent, and Y in the amount of about 0.01 to about 1 atomic percent, and the balance nickel and incidental impurities.

15. A method for coating a gas turbine airfoil comprising the steps of:

plating the airfoil with a composite coating, the composite coating comprising a substantially nickel matrix and powders selected from the group consisting of Ni, Cr, Al, Zr, Hf, Ti, Ta, Si, Ca, Fe, Y, Ga, and combinations thereof, such that upon deposition, the powders form a second phase dispersed in the nickel matrix forming a first phase; and, depositing on the coated substrate a sufficient amount of aluminum by an aluminiding process to provide a NiAl stoichiometry to achieve a substantially β phase NiAl alloy coating composition, wherein the substantially β phase NiAl alloy coating composition comprises about 30 to 50 atomic percent Al, about 0.5 to about 15 atomic percent Cr, and at least one element selected from the group consisting of Ti in the amount of about 0.1 to about 5 atomic percent, Hf in the amount of about 0.01 to about 2 atomic percent; Si in the amount of about 0.1 to about 2 atomic percent, Ga in the amount of about 0.02 to about 0.2 atomic percent, Zr in the amount of about 0.01 to about 0.5 atomic percent, Fe in the amount of about 0.02 to about 0.5 atomic percent, Y in the amount of about 0.01 to about 1 atomic percent; and the balance nickel and incidental impurities.

* * * * *

UNITED STATES PATENT AND TRADEMARK OFFICE
CERTIFICATE OF CORRECTION

PATENT NO. : 6,998,151 B2
DATED : February 14, 2006
INVENTOR(S) : Richard Grylls and Theodore Robert Grossman It is certified that error appears in the above-identified patent and that said Letters Patent is hereby corrected as shown below:

Title page,
Item [74], *Attorney, Agent, or Firm*, "Nerick" should be -- Nurick --.

Column 6,
Line 61, "stoichiometry achieve" should be -- stoichiometry to achieve --.

Signed and Sealed this

Twenty-fifth Day of April, 2006

JON W. DUDAS
*Director of the United States Patent and Trademark Office*